United States Patent [19]
Finch et al.

[11] Patent Number: 5,722,501
[45] Date of Patent: Mar. 3, 1998

[54] BEVEL STEERING GEAR INTEGRATED DRIVE TRANSMISSION

[75] Inventors: Thomas E. Finch; James A. Finch, both of Spring Branch, Tex.

[73] Assignee: Teftec Corporation, Spring Branch, Tex.

[21] Appl. No.: 652,975

[22] Filed: May 24, 1996

[51] Int. Cl.$^6$ ........................................ B60K 1/02
[52] U.S. Cl. ................. 180/6.44; 180/65.6; 180/907; 280/250.1
[58] Field of Search ................. 180/6.2, 6.44, 180/6.48, 6.5, 65.1, 65.2, 65.6, 907; 280/250.1

[56] References Cited

U.S. PATENT DOCUMENTS

| | | | |
|---|---|---|---|
| 4,405,028 | 9/1983 | Price | 180/65.7 |
| 4,433,744 | 2/1984 | Muhlbacher | 180/65.7 |
| 4,718,508 | 1/1988 | Tervola | 180/6.44 |
| 4,813,506 | 3/1989 | Smith | 180/6.44 |
| 4,917,200 | 4/1990 | Lucius | 180/6.44 X |
| 5,004,060 | 4/1991 | Barbagli et al. | 180/6.44 |
| 5,275,248 | 1/1994 | Finch et al. | 180/65.6 |
| 5,489,003 | 2/1996 | Ohyama et al. | 180/65.6 |

*Primary Examiner*—Kevin Hurley
*Attorney, Agent, or Firm*—Cox & Smith Incorporated

[57] ABSTRACT

An electrically powered vehicle having two primary ground engaging wheels operatively connected to a driving motor by an automatic transmission and to a steering motor by a shiftable bevel gear which permits opposite variations in rotational speed of the ground engaging wheels.

9 Claims, 7 Drawing Sheets

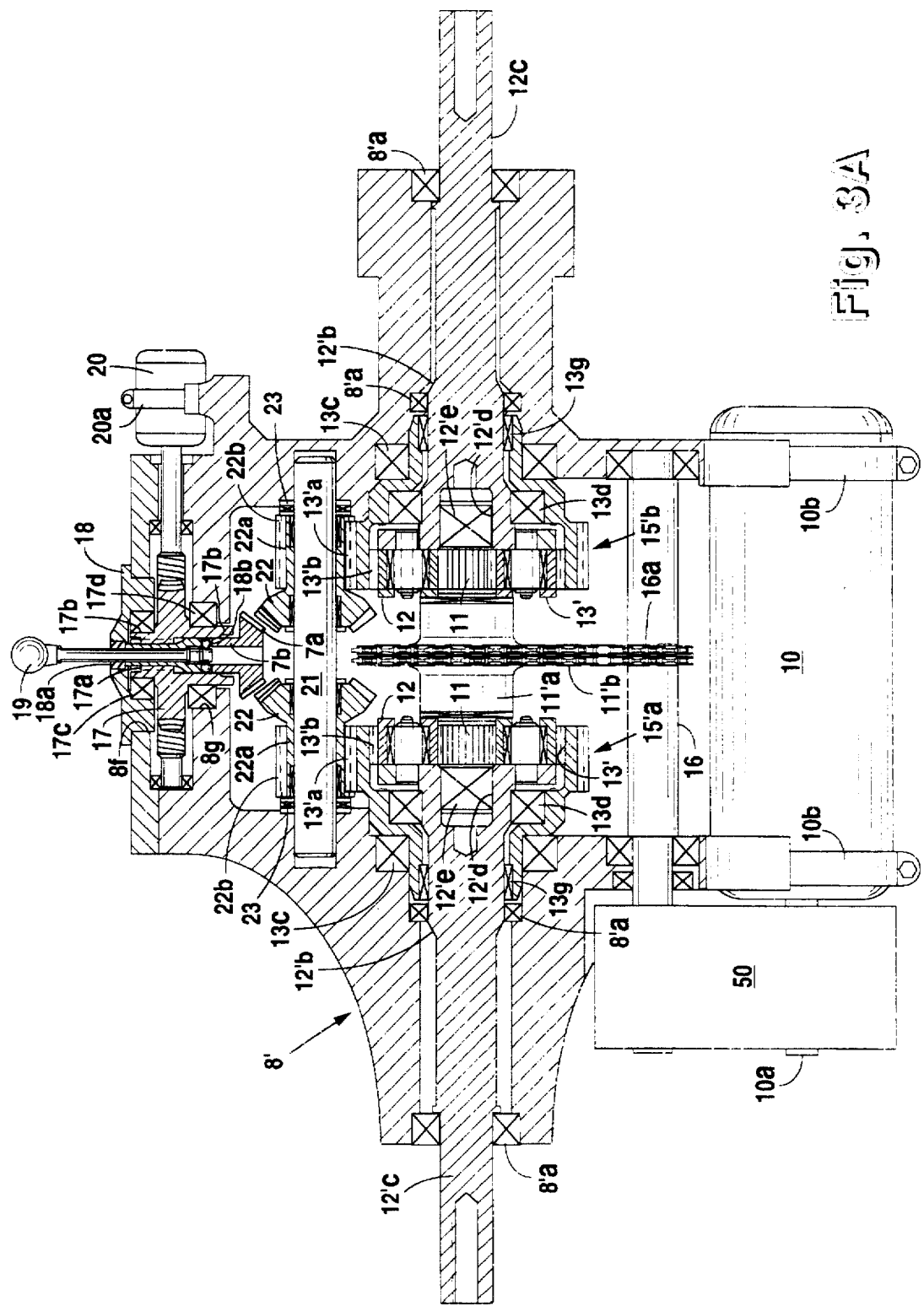

BEVEL STEERING GEAR INTEGRATED DRIVE TRANSMISSION

FIELD OF THE INVENTION

This invention relates to a planetary drive mechanism for an electrically powered vehicle such as a wheelchair or similar vehicle for transport of a handicapped person, a robot base, or any vehicle requiring up to 360 degrees turning ability without linear displacement of the vehicle. More particularly, this invention relates to an improved planetary drive system for an electrically powered vehicle over that disclosed in my prior U.S. Pat. No. 5,275,248.

BACKGROUND OF THE INVENTION

My aforesaid prior patent disclosed a novel drive mechanism for a powered wheelchair utilizing two reversible motors, one for driving the wheelchair and the second for effecting the steering of the wheelchair. The driving motor effects the concurrent rotation of the two primary ground engaging wheels in an operator selected direction through two separate planetary gear systems respectively operatively connected to such wheels by a tubular extension provided on the mounting housing for the planet gears of the respective planetary system. The operator controlled steering motor effects an opposite rotation of the ring gears of the planetary systems, which results in one wheel rotating at a different speed than the other, thereby steering the wheelchair.

While the operation of the wheelchair driving and steering mechanism disclosed in my aforesaid patent represented a significant improvement over prior art mechanisms, continued development activities have resulted in improvements to such planetary drive and steering mechanism to provide further benefits and increased safety for the handicapped operator. For example, prior art powered wheelchairs have generally required a separate driving motor for each primary ground engaging wheel. The primary reason for the duplication of driving motors for the primary ground engaging wheels of a wheelchair arises from the fact that a single motor drive would require the primary ground engaging wheels to be connected for corotation. This would then require that steering be effected by the relatively small secondary ground engaging wheel or wheels.

Steering a power operated wheelchair, or any other wheeled vehicle requiring sharp turning ability, by the secondary ground engaging wheel or wheels inherently results in a large turning radius for the wheelchair. This presents serious problems when the wheelchair is operated in a congested area, such as the typical home or department store.

Turning "on a dime" by rotating the two primary ground engaging wheels in opposite directions is prevented except by disengaging the driving connection between the two wheels and manually rotating the wheels in opposite directions, if the wheelchair occupant has sufficient strength to do so.

The use of two driving motors for the two primary ground engaging wheels of any electrically powered vehicle, which are not mechanically interconnected, necessarily requires complex electronic controls for maintaining the two driving motors in synchronism. Considering the variable torque requirements separately required by the primary ground engaging wheels by variations in the terrain encountered by each wheel, this means that the motor speeds are continually being adjusted and true synchronism of the primary ground engaging driving wheels is seldom attained. Thus the prior art wheelchairs move along a wobbling path.

Additionally, safety regulations that will soon be applicable to all powered wheelchairs limit the maximum speed of the wheelchair to about six miles per hour. The maximum speed of the wheel driving motor or motors are therefore limited to that necessary to drive the wheelchair at about six miles per hour on a level floor or ground.

As is well known, the maximum torque and horsepower output of a reversible electric motor (as well as an internal combustion engine) is obtained when the motor rotational speed is on the order of 1800 to 3000 rpm, hence many times higher than the customary rotational speed of the primary ground engaging wheels of wheelchairs and similar vehicles at a vehicle speed of six miles per hour. Thus the rotational speed ratio of the electric motor to the rotational speed of the driving wheels is on the order of 20–50 to 1, depending on the diameter of such driving wheels. With two motors, this required two gear boxes or chain drives of significant size and weight compared to other components of the wheelchair.

In the mechanism disclosed in my aforesaid U.S. patent, a single driving motor is connected by a belt drive, having an essentially one to one gear ratio, to a transfer shaft having a small pinion secured thereto and driving a large gear of substantially the same size as the ring gears of two planetary gear systems. This large gear has the two sun gears of the two planetary systems integrally formed on its opposite sides to provide a large gear ratio belt drive. This gear ratio, plus that inherent in the planetary gear systems provides a large reduction in wheel rotational speed relative to the optimum motor rotational speed without increasing the size of the planetary gear systems to an intolerable dimension. Thus the motor may be operated at an optimum motor speed level without exceeding any prescribed 6 miles per hour maximum speed of the wheelchair.

However, when an upgrade or soft terrain was encountered, this optimum motor speed was not capable of maintaining the desired speed of the wheelchair. On severe grades, stalling and thermal deactivation of the motor could occur. On down grades, the wheelchair speed could exceed the six miles per hour limitation and, unless the handicapped operator took action to reduce the motor speed, or apply hand operated brakes, a speed responsive safety switch would operate to cut off power to the driving motor.

A further problem encountered with the powered wheelchair driving and steering mechanism of my aforesaid U.S. patent is the complicated design of the mechanism for effecting the connection of a reversible steering motor to the two planetary gear drive systems to effect a speed differential between the two planetary wheel driving housings to produce steering of the wheelchair in a desired direction by varying the speed of one ground engaging wheel relative to the other. The minimum turning radius is then the lateral spacing of the primary ground engaging wheels, when one wheel is maintained stationary as the other wheel rotates. In place turning of the vehicle, where one primary ground engaging wheel is selectively rotated in one direction while the other primary ground engaging wheel is rotated in the opposite direction, required an extra reversing shaft and gear to be incorporated in the gear train driven by the steering motor.

Lastly, a more rapid connection of the steering motor to the driving wheels is desirable.

SUMMARY OF INVENTION

The object of this invention is to provide an improved driving and steering mechanism for electrically powered wheelchairs, or similar electric motor driven, wheeled vehicles, that overcomes the above stated problems of prior art mechanisms.

Two reversible electric motors are employed, one for synchronously driving the two primary ground engaging wheels of the vehicle and the second for effecting the power steering of the wheelchair by producing a differential in rotational speeds of the two ground engaging wheels.

In a first embodiment of the invention, the driving motor is operatively connected to the ring gears of two planetary gear systems. In a second embodiment, the driving motor is operatively connected to the sun gears of the two planetary gear systems.

In both embodiments, the planetary gear housings are respectively operatively connected to the ground engaging wheels of the wheelchair to rotate same at equal speeds by utilizing a worm gear operated by the steering motor to prevent relative rotation of the sun gears in the first embodiment of the invention, or to prevent relative rotation of the ring gears in the second embodiment, when the steering motor is not activated.

In both embodiments, the driving motor is connected to a transfer shaft by an automatic transmission mechanism which, in my preferred embodiment, may comprise two belt connected, adjustable diameter, V-shaped pulleys. In the first embodiment of this invention, the transfer shaft is connected by small gears or chain sprockets to enlarged gears or sprockets respectively formed on the exterior of the ring gears of the two planetary gear systems. In the second embodiment, a single enlarged gear or sprocket may be integrally formed or otherwise corotatably connected to the sun gears of the two planetary gear systems.

In the first embodiment, the planetary gear mounting housings of the two planetary gear systems each have a shaft with a pinion thereon that drives a larger gear secured to the respective inwardly projecting end of a shaft which mounts a primary ground engaging wheel. In the second embodiment, the planetary gear mounting housings respectively directly drive the shafts on which the ground engaging wheels are mounted.

In both embodiments, the adjustable diameter V-shaped pulley on the electric driving motor shaft has an axially adjustable side which is shifted in response to motor speed or torque transmitted to increase the motor speed relative to the ground engaging wheels, if the ground engaging wheels encounter an upgrade or a soft surface, or conversely, to decrease the motor speed relative to the ground engaging wheels when a downgrade or improved surface is encountered.

In both the first and second embodiments of this invention, the steering motor is operatively connected to a first bevel gear having an axis perpendicular to the axis of the planetary drive system. Such first bevel gear is axially shiftable by the operator.

In the first embodiment, as stated above, the driving motor is operatively connected to the ring gears of the two planetary gear drive systems by an automatic transmission mechanism. A pair of bevel gears are secured to the two opposed sun gears in spaced, opposed relationship. The first bevel gear is then axially shifted by the operator into engagement with said pair of bevel gears. When the steering motor is energized in an operator selected direction, the sun gears of the two planetary gear systems are oppositely rotated in selected directions, thus producing a variation in rotational speed of the two planetary gear housings, hence varying the speed of the two primary ground engaging wheels to effect steering in an operator selected direction.

If the driving motor is deenergized, the operation of the steering motor will produce equal and opposite rotations of the two ground engaging wheels, resulting in the vehicle turning in place.

In the second embodiment, the driving motor is operatively connected by an automatic transmission mechanism to the sun gears of the two planetary systems. A second transfer shaft is provided in parallel relationship to the axis of the planetary drive systems and a pair of bevel gears are mounted on the second transfer shaft in spaced, opposed relationship. These bevel gears respectively have two integral gears that are respectively engagable with gear teeth formed on the external periphery of each ring gear of the two planetary gear systems. The first bevel gear is manually shiftable into engagement with the two bevel gears on the second transfer shaft.

In the second embodiment of this invention, the rotation of the first bevel gear in an operator selected direction by the steering motor then effects opposite rotational speed changes of the ring gears of the planetary gear system, hence producing a selected speed variation of the two primary ground engaging wheels to effect steering of the vehicle. Turning in place is thus possible by deenergizing the driving motor and using only the steering motor.

The afore described driving mechanism provides an adequate gear ratio between the electric driving motor and the primary ground engaging wheels to permit the motor to operate at an optimum speed at any operator setting of a conventional motor speed control. In both embodiments the automatic transmission incorporated in the driving connection between the driving motor and the primary ground engaging wheels automatically changes the gear ratio to maintain optimum motor speed and operator selected ground speed irrespective of variations in the ground terrain.

Further objects and advantages of this invention will be readily apparent to those skilled in the art from the following detailed description, taken in conjunction with the annexed sheets of drawings.

BRIEF DESCRIPTION OF DRAWINGS

FIG. 3A is a view similar to FIG. 3 but showing the steering motor disconnected from the ring gears of the two planetary gear systems.

DETAILED DESCRIPTION OF PREFERRED EMBODIMENTS

Figure 1:
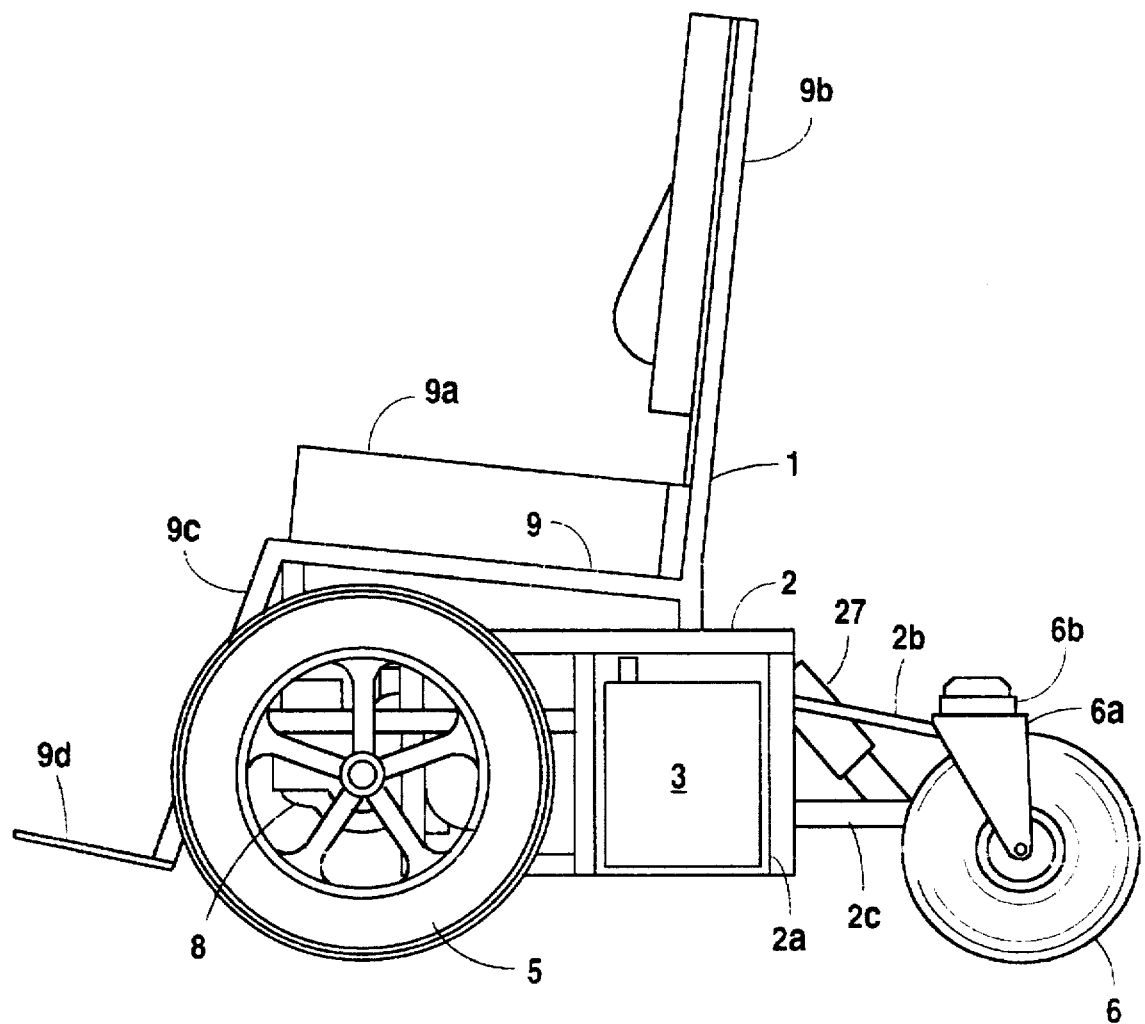
FIG. 1 is a schematic, side elevational view of a wheelchair having a power driving and steering mechanism embodying this invention.

Referring to FIG. 1, there is schematically shown an electrically powered wheeled vehicle incorporating this invention. The specific vehicle shown is a wheelchair 1, but the invention may be applied to any other type of electric motor driven wheeled vehicle requiring the ultimate in maneuverability.

Wheelchair 1 comprises an articulated frame 2 having the various frame elements conventionally secured together by welding or by mechanical fasteners. Frame 2 defines a battery compartment 2a, within which batteries 3 are mounted. Frame 2 also mounts a pair of laterally spaced bearing supports 2b (FIG. 2) which respectively provide bearing supports for the inner ends of axle shafts 4. Primary ground engaging wheels 5 are respectively mounted on the outwardly projecting ends of axle shafts 4.

Projecting rearwardly from frame 2 are a pair of upper links 2b and a lower swing arm 2c which form a parallelogram and terminate into a cross-member 6b which incorporates two vertical axis hubs 6a form journaling two laterally spaced, castering rear wheels 6. The vertical position of rear wheels 6 relative to the frame 2 may be varied by a spring/shock absorber link 27 mounted between the parallelogram links 2b to the lower swing arm 2c and the upper rear portion of the frame 2. Link 27 may be either a gas cylinder or a spring, depending on the preference of the operator propelling the wheelchair 1. The gas cylinder or spring may incorporate a viscous damped cylinder.

A seat structure 9, has a seat element 9a which may be cushioned, a back portion 9b which may be reclinable, a forwardly and downwardly projecting leg support 9c and conventional foot supports 9d, all of which are conventionally mounted on the frame 2. It will be particularly noted that with the described configuration, the center of gravity of the structure, including the weight of the occupant of the seat, is disposed rearwardly of the horizontal axis of rotation of the primary ground-engaging wheels 5 due to the weight of the battery, or other power source to be later discussed, being disposed rearwardly of the axis of the ground-engaging wheels 5.

A transaxle gear housing 8 is supported between the two bearing supports 2b and a cover element 2e secured to frame 2 completes the enclosure of each end of transaxle gear housing 8 and also defines a chamber 2f in which a large gear 4a, formed on, or secured to each inner end of the axle shafts 4, is housed.

The transaxle housing 8 defines at each end recesses to receive bearings 8a. Bearings 8a respectively journal a shaft end 12c of a planetary gear housing 12b. The outer end of shaft 12c has pinion teeth 12d formed thereon which mesh with the large gear 4a. Planetary gear housing has an enlarged inner end 12a which rotatably mounts three angularly spaced planet gears 12. Thus, rotation of planet gear housing 12b results in a lower speed rotation of the ground engaging wheels 5.

The inner ends of the planetary gear housings 12b are respectively provided with axial recesses which provide a rotatable mounting for the two ends of a sun gear shaft 11a. Two sun gears 11 are respectively mounted on sun gear shaft 11a in radial alignment with the two sets of three planetary gears 12 and meshing therewith.

Two ring gears 13 are provided to respectively cooperate with the two sets of planetary gears 12. The internal teeth 13e of each ring gear 13 are formed on the enlarged inner end of a hollow frusto-conically shaped ring gear mounting 13a. The small outer ends 13b of each ring gear mounting 13a are rotatably supported by bearings 13c and 13d mounted in transaxle gear housing 8. The internal teeth 13e of each ring gear 13 mesh with the respective teeth of the planetary gears 12 in conventional fashion. Thus two conventional planetary gear systems 15a and 15b are provided in gear housing 8 in transversely spaced, coaxial relationship.

Figure 2:
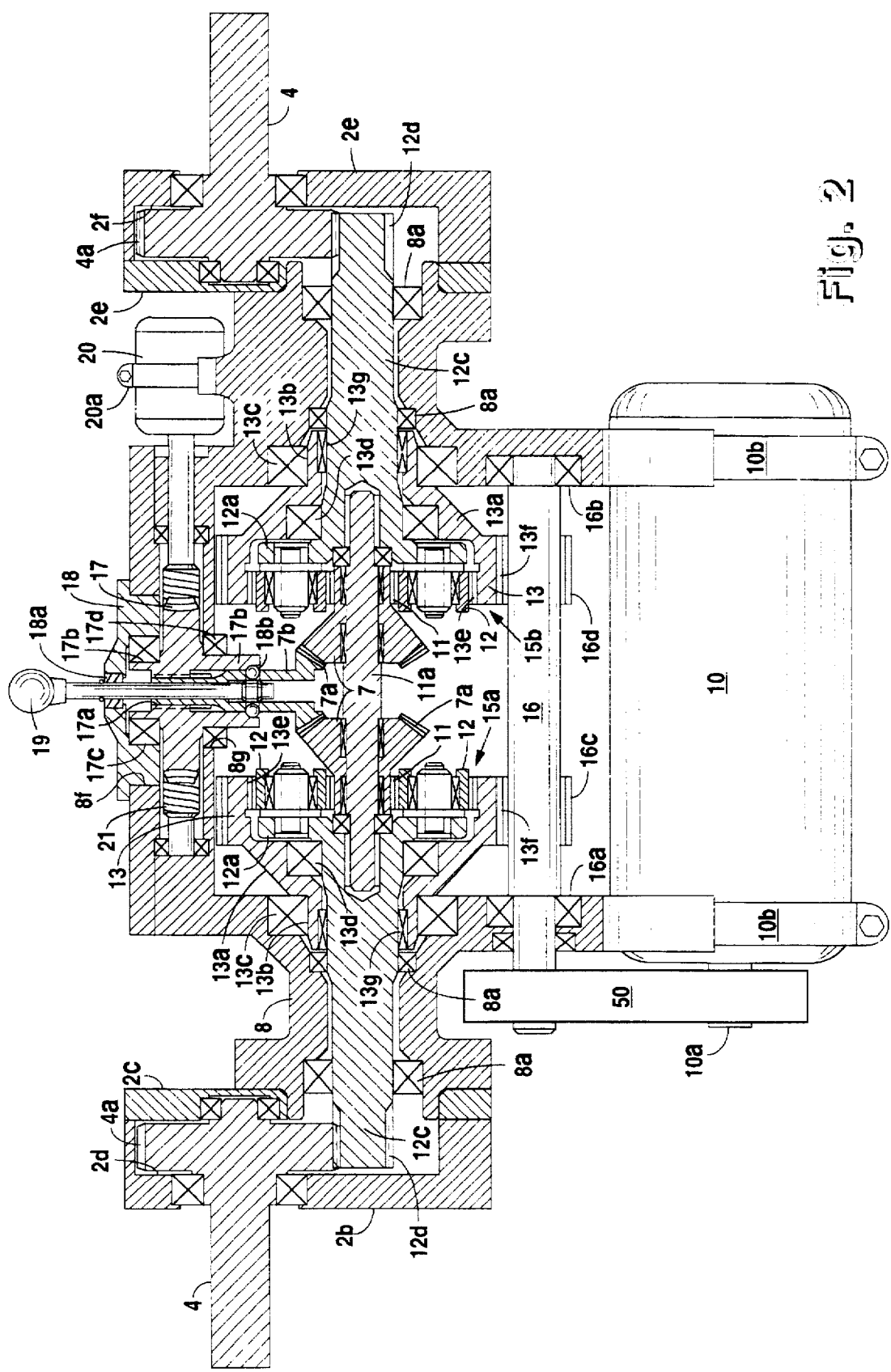
FIG. 2 is a vertical sectional view of the wheelchair of FIG. 1 with portions of the transaxle case and other parts removed for clarity of illustration and showing one embodiment of the invention with the driving motor operatively connected to the two ring gears of the two planetary gear systems.

Referring to FIG. 2, and assuming that a battery powered, reversible motor is to be utilized to drive the powered wheelchair, such electric motor 10 is conventionally supported on either frame 2 or transaxle gear box 8 by straps 10b with its axis horizontal and parallel to the axis of primary ground engaging wheels 5.

Figure 5:
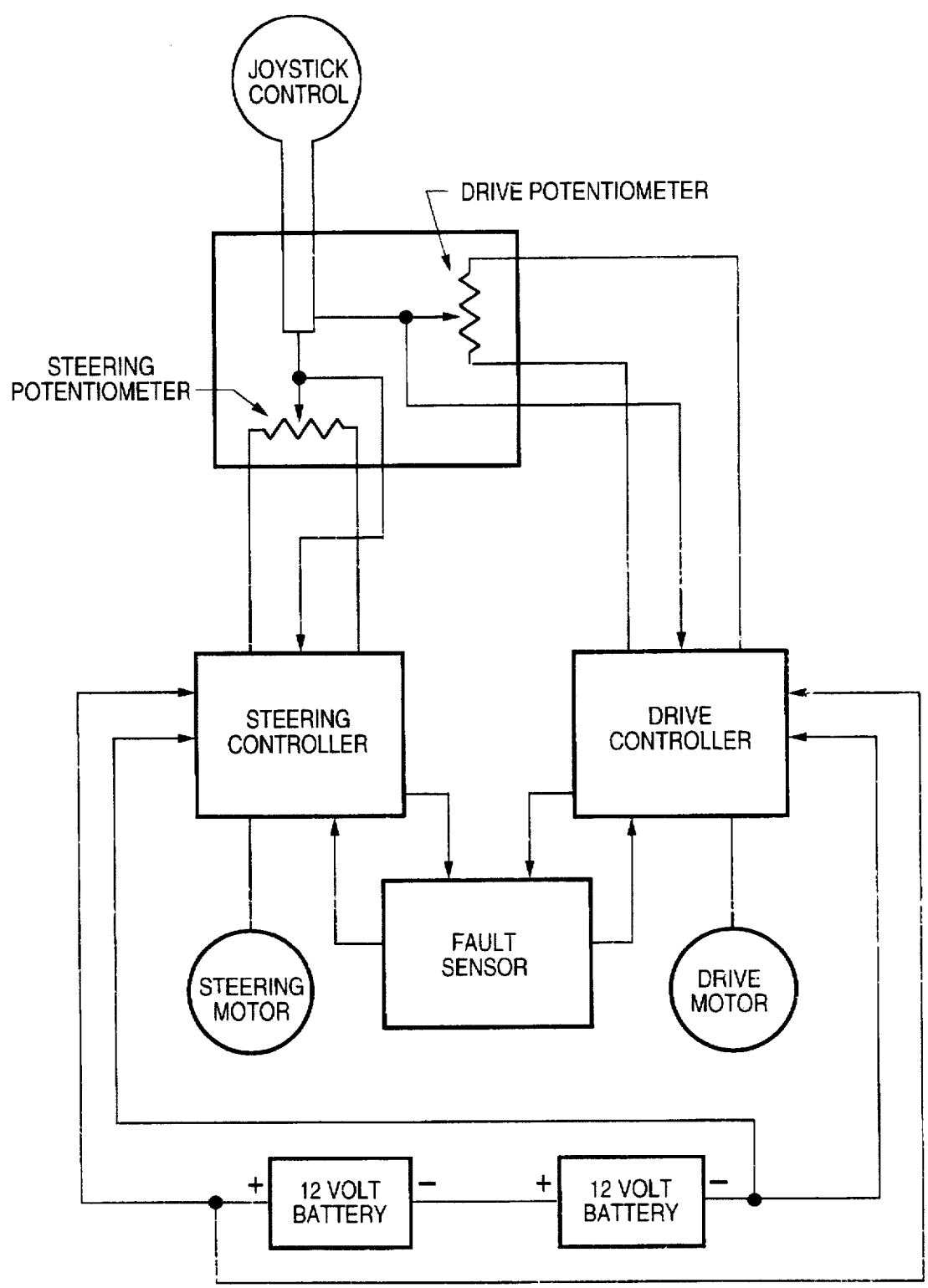
FIG. 5 is a schematic circuit diagram of the electrical controls for the driving and steering electric motors.

Motor 10 has an outwardly projecting output shaft 10a. Output shaft 10a is drivingly connected to a first transfer shaft 16 by any conventional automatic transmission mechanism 50, a preferred form of which is illustrated in FIG. 5 and which will be later described. Automatic transmission 50 preferably provides a gear ratio between motor output shaft 10a and transfer shaft 16 ranging from about a positive 2 to 1 to a negative 1 to 2 depending upon the speed of motor shaft 10a or the torque transmitted to the transfer shaft 16.

First transfer shaft 16 is journaled in two transversely spaced bearings 16a and 16b mounted in suitable recesses provided in transaxle gear housing 8. In the first embodiment of the invention shown in FIGS. 2 and 2a, a pair of small gears 16c and 16d are secured to transfer shaft 16 at positions respectively aligned with external gear teeth 13f of the two ring gears 13 of the two planetary drive systems 15a and 15b.

Accordingly, if sun gears 11 are prevented from rotating, by apparatus to be described, both sets of planetary gears 12 are synchronously rotated around their respective sun gears 11 by motor 10, hence both primary ground engaging wheels 5 are synchronously driven, and the vehicle will move in a straight line. On the other hand, if the sun gears 11 are freely rotatable, the vehicle can be manually moved and turned by differential rotation of the wheels 5 without energizing the motor 10.

To effect the steering of the vehicle by selectively varying the relative speeds of rotation of the two ground engaging wheels 5, each sun gear 11 is secured to, or integrally formed with, a bevel gear 7. Bevel gears 7 are disposed in spaced, inwardly facing relationship.

A third bevel gear 7a is rotatably mounted in transaxle housing 8 for rotation about an axis that is perpendicular and radial relative to the axis of sun gear shaft 11a. Bevel gear 7a has an axially extending hollow shaft 7b, which is slidably mounted in the splined bore 17a of a large worm gear 17, which has hollow stub shafts 17b respectively mounted in bearings 17c and 17d. Bearing 17c is provided in a hollow cap structure 18 which is conventionally mounted in an opening 8f provided in transaxle housing 8. Bearing 17d is mounted in a recess 8g provided in transaxle housing 8.

Figure 2A:
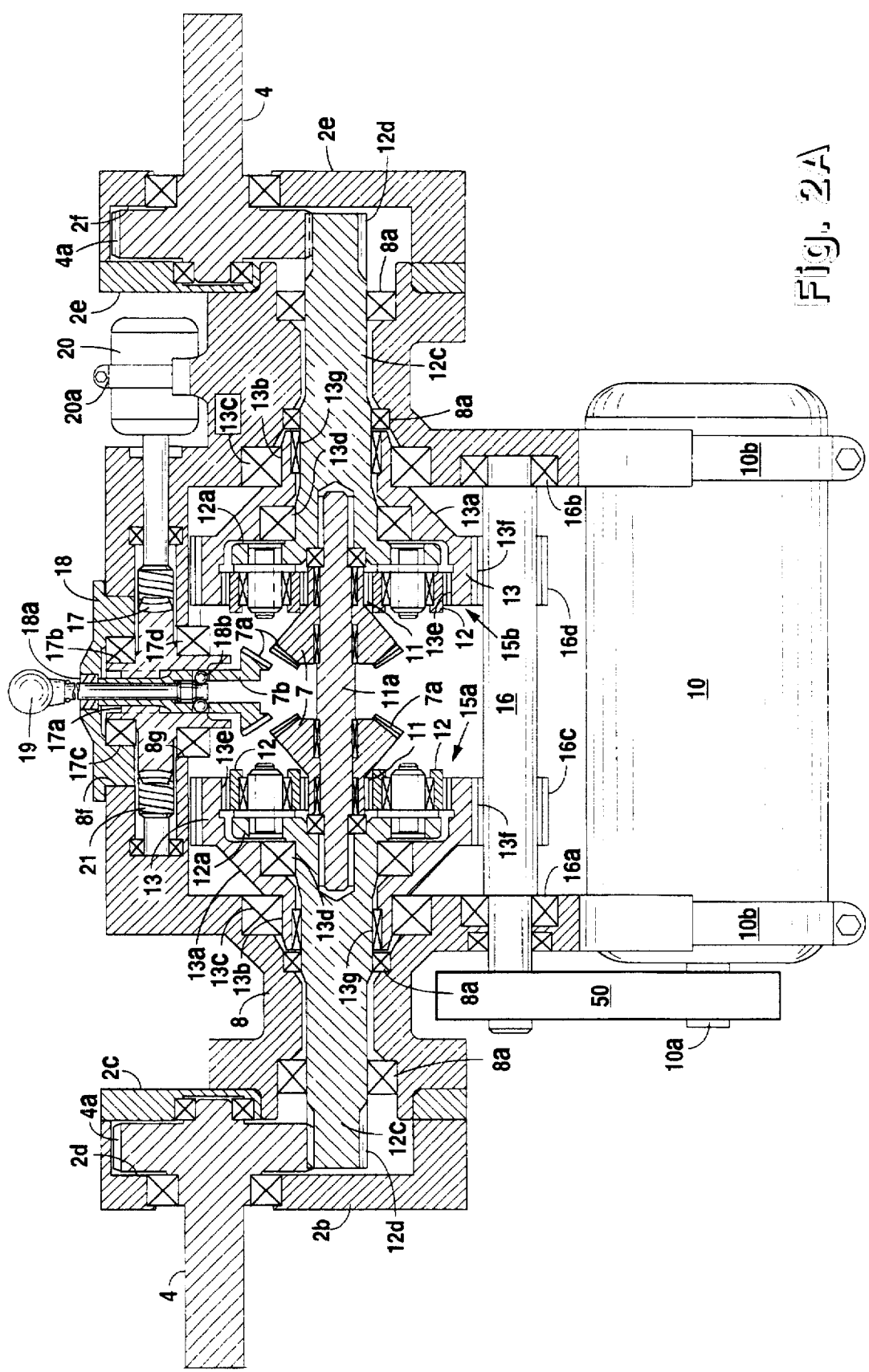
FIG. 2A is a view similar to FIG. 2 but showing the steering motor disconnected from the sun gears of the two planetary gear systems.

The third bevel gear 7a is manually shiftable from a radially inward position of engagement with the bevel gears 7 of the planetary system 10, as shown in FIG. 2, to a radially outer position of disengagement with the bevel gears 7, as shown in FIG. 2A. In the engaged position, rotation of bevel gear 7a will effect an opposite rotation of the sun gears 11, producing a variation of the rotational speed of planetary gear housings 12, hence a variation in the rotational speed of the primary ground engaging wheels 5, to effect steering of the vehicle.

The shifting of the bevel gear 7a between engaged and disengaged positions relative to the bevel gears 7 is accomplished manually by a hand operated plunger 19 which passes through a seal 18a in cover 18 and traverses the bore 17a of the large worm gear 17. Downward movement of plunger 19 effects the outward displacement of detent balls 18b, as shown in FIG. 2 and locks the bevel gear 7a in its engaged position with bevel gears 7. Raising the plunger 19 will retract the detent balls 18b and raise the third bevel gear 7a to its disengaged position shown in FIG. 2A. The steering motor 20 is then disconnected from the planetary drive systems 15a and 15b, permitting unimpeded manual movement of the wheelchair 1.

Rotation of the bevel gear 7a is accomplished by a steering motor 20 which is suitably secured to the transaxle gear housing 8 by a strap 20a. Steering motor 20 is a reversible direct current motor energized by the batteries 3 and drives a small worm gear 21, which drives large worm gear 17. Third bevel gear 7a drives bevel gears 7, which in turn drives the sun gears 11 in opposite directions and thus change the relative rotational speeds of the two ground engaging wheels 5 to effect steering of the vehicle when driving motor 10 is energized. If driving motor 10 is not energized, and bevel gear 7a is in its engaged position, then steering motor 20 will effect reverse rotation of the two ground engaging wheels 5 to cause the vehicle to turn in place.

Figure 3:
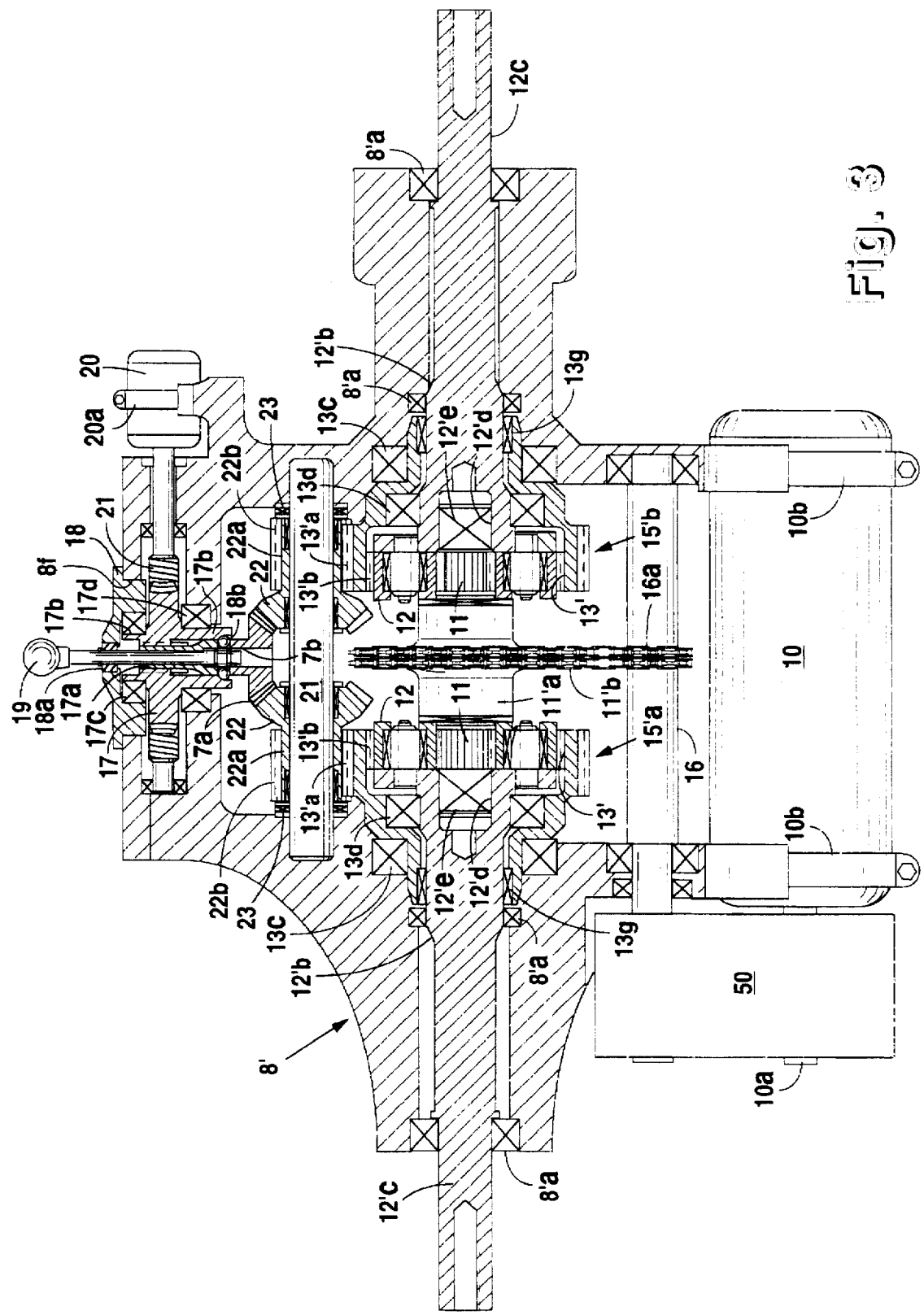
FIG. 3 is a view Similar to FIG. 2 but showing a second embodiment of the invention with the driving motor operatively connected to the sun gears of the two planetary gear systems.
Figure 4:
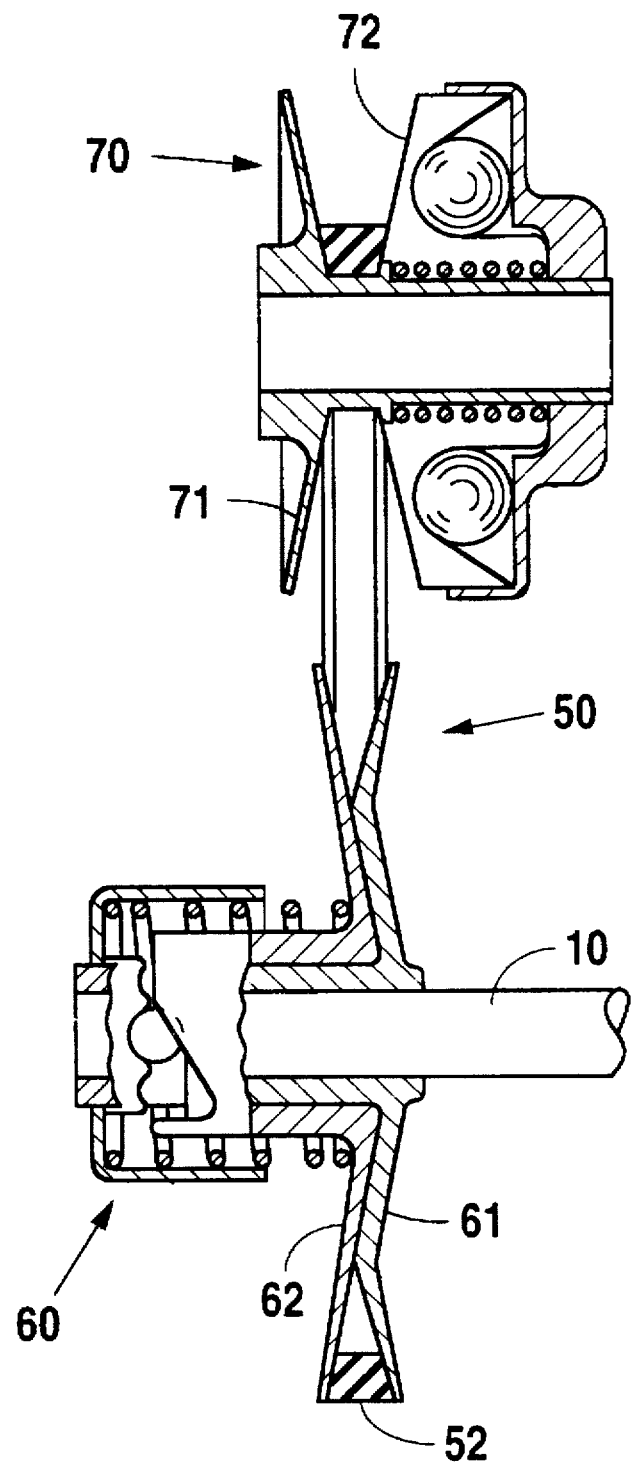
FIG. 4 is a schematic view of a preferred embodiment of an automatic transmission connected between the driving motor and the two planetary gear systems of FIGS. 2, 2A, 3 and 3A.

Referring now to FIGS. 3 and 3A, there is illustrated a second embodiment of the invention. Similar numerals in FIGS. 3 and 3A indicate components already described in connection with FIGS. 1, 2 and 2A. In the second embodiment of the invention, the primary ground engaging wheels 5 are respectively directly connected to the outer ends of elongated shaft portions 12'c of the planetary gear mounting housings 12'b which are respectively journalled in transversely spaced bearings 8'a provided in transaxle gear housing 8'. The inner ends of planetary gear mounting housing 12'b have axial bores 12'd which receive bearings 12'e which respectively rotatably support the opposite ends of a sun gear shaft 11'a on which the sun gears 11 of the two planetary gear systems 15'a and 15'b are mounted and secured in transversely spaced, co-rotatable relationship. Thus wheels 5 are directly driven by the planetary gear housings and not by an intermediate gear connection as in the first embodiment.

The power from electric motor 10 to synchronously drive the ground engaging wheels 5, is applied to the sun gears 11 of the two planetary gear systems 15'a and 15'b by a chain drive 30 connecting a small sprocket 16a on the first transfer shaft 16 to a large sprocket 11'd which is secured to the sun gear shaft 11'a for corotation.

Alternatively, a small and large gear (not shown) may effect the driving connection. In either case, the sun gears 11 of the two planetary gear systems 15'a and 15'b are driven by motor 10 through an automatic transmission 50 and a large gear ratio connection from first transfer shaft 16.

Ring gears 13' are provided with external teeth 13'a in addition to the conventional inner teeth 13'b which engage the planetary gears 12. To drive the ring gears 13', a pair of bevel gears 22 are rotatably mounted in axially spaced relation on a second transfer shaft 21. Shaft 21 is mounted in suitable bearings 23 conventionally mounted in the transaxle gear housing 8'. Each bevel gear 22 is provided with an axial extension 22a on which are formed teeth 22b which are respectively engagable with the external teeth 13'a formed on ring gears 13'. Hence rotation of the two bevel gears 22 in opposite directions effects rotation of the two ring gears 13' in opposite directions, thus producing opposite variations in rotational speed of the two primary ground engaging wheels 5.

To rotate the bevel gears 22 in opposite directions, the same mechanism is utilized as described in connection with the modification of this invention shown in FIGS. 2 and 2A. Thus, steering motor 20 drives a worm gear 21 which, in turn effects the driving of a large worm gear 17 which has a hub extension defining or mounting a bevel gear 7a, which is engagable with both bevel gears 22 on second transfer shaft 21. A manually operable plunger 19 effects the axial displacement of third bevel gear 7a from a position of engagement with bevel gears 22, as shown in FIG. 3, to a position of disengagement shown in FIG. 3A. Thus, all of the operational characteristics of the first embodiment of the invention are available with the second embodiment.

Referring now to FIG. 5, a preferred form of automatic transmission 50 is illustrated, the elements of which are commercially available. Thus a torque responsive, adjustable diameter V pulley 60 is secured to motor shaft 10a. Such pulley has a stationary side 61 and an axially shiftable side 62, which is axially shiftable in response to the torque being transmitted by belt 52.

A second speed responsive adjustable V pulley 70 is mounted on the transfer shaft 16. This pulley has an axially stationary side 71 and a speed responsive, axially shiftable V side 72. Thus, when the primary ground engaging wheels 5 of the electric powered vehicle encounter an upgrade or soft terrain, the resulting increase in torque and the slowing of the driving motor 10 will effect an increase in effective diameter of the driven pulley 70 and a corresponding decrease in effective diameter of the driving pulley 60, thus automatically increasing the gear ratio of the motor relative to the ground engaging wheels to prevent stalling and burnout of the driving motor.

While the employment of the two described adjustable pulleys is preferred, acceptable results can be attained by using only one of such pulleys, either torque or speed responsive, plus a belt tightening pulley to remove slack from the belt 52 produced by changes in the effective diameter of the adjustable pulley.

Each of the aforementioned adjustable pulleys is available from commercial suppliers, such as Comet Industries of Richmond, Indiana, hence further description is unnecessary.

FIG. 6 schematically represents an electric circuit for controlling the operation of motors 10 and 20 at operator selected speeds and direction. The circuit diagram is believed to be self explanatory to any person skilled in the art of electrically driven vehicles.

Such person would also recognize that if the apparatus of this invention is utilized for remotely controlled vehicles, such as a wheeled base for a robot, that a solenoid can be employed for operation of the bevel gear engagement control plunger 19, and electromagnetic signals can be employed for operating the plunger solenoid and the direction and speed controls for the driving motor 10 and the steering motor 20.

Obvious modifications of this invention can readily be made by those skilled in the art of electric motor driven vehicles and it is intended that all such modifications fall within the scope of the appended claims.

We claim:

1. An electric motor powered wheeled vehicle comprising:
   a frame defining transversely spaced coaxially aligned bearings;
   a pair of shafts respectfully journalled in said bearings for rotation about a horizontal axis, said shafts having end portions respectively projecting axially beyond said beatings;
   a pair of primary ground engaging wheels respectively driven by said end portions of said shafts;
   secondary ground engaging wheels mounted on said frame in longitudinally spaced relation to said primary ground engaging wheels;
   a pair of identical planetary gear drive systems respectively coaxially mounted on said frame in axially spaced, coaxial relationship, each of said planetary gear systems comprising a sun gear, a planetary gear housing, a plurality of angularly spaced planet gears mounted on said housing and cooperating with the respective sun gear, and a ring gear surrounding said planetary gears and having internal teeth cooperating with each said planet gear of the respective planetary gear system;
   said planetary gear housings being respectively operatively connected to said shafts;
   a first reversible electric motor mounted on said frame;
   means for energizing and selecting the direction of rotation of said first electric motor;
   means for operatively connecting said first electric motor to one of said sun gear and ring gear of each said planetary gear drive systems to concurrently drive said shafts and said primary ground engaging wheels at equal speeds when the other of said sun gears and said ring gears are secured against relative movement;
   a second reversible electric motor mounted on said frame;
   means for energizing and for selecting the direction of rotation of said second reversible electric motor;
   a primary bevel gear axially shiftably mounted on said frame for rotation about an axis perpendicular to the axis of said planetary gear systems, said primary bevel gear being rotatable in a selected direction by said second electric motor; and
   means for axially shifting said primary bevel gear into operative engagement with said other of said sun gears and ring gears that are not operatively connected to said first electric motor, whereby energization of said second electric motor changes the relative rotational speed of said primary ground engaging wheels to effect the steering of the vehicle.

2. The apparatus defined in claim 1 wherein said first electric motor is operatively connected to said ring gears of said two planetary gear systems and said sun gears are provided with spaced opposed coaxial primary bevel teeth; said bevel gear being engagable with said bevel teeth.

3. The apparatus of claim 1 further comprising a worm gear effecting the driving connection of said second electric motor to said primary bevel gear;
   said worm gear preventing non-synchronous rotation of said planetary housings and said primary ground engaging wheels when said secondary motor is deenergized.

4. The apparatus of claim 1 wherein said means for axially shifting said primary bevel gear into operative engagement with said ring gears comprises:
   external gear teeth formed around the outer periphery of each said ring gear;
   a third shaft mounted on said frame parallel to the axis of said planetary systems and adjacent to said ring gears;
   a pair of secondary bevel gears rotatably mounted on said third shaft in axially spaced, opposed relationship;
   each of said secondary bevel gears having a tubular extension respectively adjacent said ring gears and defining gear teeth respectively engagable with said external gear teeth formed on the outer periphery of the adjacent ring gear; and
   said primary bevel gear cooperating with said pair of secondary bevel gears to drive said ring gears in opposite directions by energization of said second reversible motor.

5. The apparatus of claim 1 wherein said vehicle comprises an electric motor powered wheelchair and wherein said means for operatively connecting said first electric motor to one of said sun gear and ring gear of each said planetary gear drive systems comprises automatic torque transmission means for concurrently driving said ground engaging wheels;
   means for setting a desired speed of travel of the vehicle produced by said first reversible electric motor;
   said automatic transmission means being operable to vary the gear ratio between said first reversible electric motor and said primary ground engaging wheels to maintain said desired speed of travel of the wheelchair.

6. The apparatus of claim 5 wherein said automatic transmission means comprises a pair of V-shaped pulleys interconnected by a V-belt;
   at least one of said V-shaped pulleys having torque responsive means for increasing or decreasing the diameter of said V-belt engagement with said one V-shaped pulley; and
   means for maintaining a predetermined slack level in said V-belt.

7. The apparatus of claim 5 wherein said automatic transmission means comprises a pair of V-shaped pulleys interconnected by a V-belt;
   at least one of said V-shaped pulleys having speed responsive means for increasing or decreasing the diameter of said V-belt engagement with said one V-shaped pulley; and
   means for maintaining a predetermined slack level in said V-belt.

8. The apparatus of claim 5 further comprising manually operated means for axially shifting said bevel gear into said concurrent engagement with said bevel gear teeth.

9. The apparatus of claim 1 wherein said means for operatively connecting said primary bevel gear in operative engagement with said sun gears of said two planetary systems comprises bevel gear teeth provided on each of said sun gears in opposed, adjacent relation; whereby said primary bevel gear may be axially shifted into concurrent engagement with the bevel gear teeth provided on each said sun gear to rotate said sun gears in opposite directions, thereby effecting steering of the vehicle.

* * * * *